United States Patent
Ledoux et al.

(10) Patent No.: US 11,072,567 B2
(45) Date of Patent: Jul. 27, 2021

(54) UREA-BASED BLEND COMPOSITION AND METHOD FOR THE MANUFACTURE THEREOF

(71) Applicant: YARA INTERNATIONAL ASA, Oslo (NO)

(72) Inventors: Francois Ledoux, Cormeilles en Parisis (FR); Filip Colpaert, Zwijnaarde (BE); Ruud Van Belzen, Middelburg (NL)

(73) Assignee: YARA INTERNATIONAL ASA, Oslo (NO)

( * ) Notice: Subject to any disclaimer, the term of this patent is extended or adjusted under 35 U.S.C. 154(b) by 253 days.

(21) Appl. No.: 15/767,446

(22) PCT Filed: Nov. 10, 2016

(86) PCT No.: PCT/EP2016/077315
§ 371 (c)(1),
(2) Date: Apr. 11, 2018

(87) PCT Pub. No.: WO2017/081183
PCT Pub. Date: May 18, 2017

(65) Prior Publication Data
US 2018/0297903 A1    Oct. 18, 2018

(30) Foreign Application Priority Data
Nov. 12, 2015   (NO) .................................. 20151546

(51) Int. Cl.
*C05G 3/90*     (2020.01)
*C05C 9/00*     (2006.01)
*C07F 9/22*     (2006.01)

(52) U.S. Cl.
CPC ................ *C05C 9/005* (2013.01); *C05G 3/90* (2020.02); *C07F 9/222* (2013.01)

(58) Field of Classification Search
CPC .. C05C 9/005; C05C 9/00; C05G 3/90; C05G 1/00; C07F 9/222
See application file for complete search history.

(56) References Cited

U.S. PATENT DOCUMENTS

2002/0139158 A1* 10/2002 Hunter .................... C05G 3/20
                                                             71/35
2004/0221631 A1* 11/2004 Kerrigan .................. C05B 1/02
                                                             71/31
(Continued)

FOREIGN PATENT DOCUMENTS

AU    2012250293 A1  * 12/2016
CN    102503686 A    *  6/2012
(Continued)

OTHER PUBLICATIONS

Milani, Narges, et al. "Dissolution kinetics of macronutrient fertilizers coated with manufactured zinc oxide nanoparticles." Journal of agricultural and food chemistry 60.16 (2012): 3991-3998.*
(Continued)

*Primary Examiner* — Jennifer A Smith
(74) *Attorney, Agent, or Firm* — Amster, Rothstein & Ebenstein LLP

(57) ABSTRACT

The invention relates to a solid, particulate, urea-based blend composition comprising a urea-based compound in particulate form, one or more components in particulate form, selected from the group of nitrates, phosphates, sulphates and chlorides, and a urease inhibitor of the type phosphoric triamide, in particular N-(n-butyl) thiophosphoric triamide (nBTPT), wherein the urea-based blend composition is further characterized in that it comprises one or more reactive alkaline or alkaline-forming inorganic or organic compounds. The composition according to the invention has been stabilized against the degradation of a urease inhibitor of the type phosphoric triamide, in particular N-(n-butyl)

(Continued)

thiophosphoric triamide (nBTPT). The invention further relates to a method for the manufacture of the claimed solid, particulate, urea-based blend composition.

28 Claims, 5 Drawing Sheets

(56) References Cited

U.S. PATENT DOCUMENTS

| | | | |
|---|---|---|---|
| 2008/0271368 A1* | 11/2008 | Yamada | C05B 17/00 |
| | | | 47/57.6 |
| 2010/0206030 A1* | 8/2010 | Whitehurst | C07F 9/224 |
| | | | 71/30 |
| 2010/0206031 A1 | 9/2010 | Whitehurst et al. | |
| 2011/0259068 A1 | 10/2011 | Whitehurst et al. | |
| 2012/0096912 A1 | 4/2012 | Rizzo | |
| 2014/0037570 A1 | 2/2014 | Whitehurst et al. | |
| 2014/0047882 A1 | 2/2014 | Gabrielson et al. | |
| 2015/0197460 A1 | 7/2015 | Gabrielson et al. | |

FOREIGN PATENT DOCUMENTS

| | | |
|---|---|---|
| CN | 102503687 A | 6/2012 |
| WO | 2011009572 A1 | 1/2011 |

OTHER PUBLICATIONS

Chemscien Chemical."What is urease inhibitor—NBPT" <http://www.chemscien.com/en/news_event/180/> Jul. 15, 2015.*
PCT International Search Report and Written Opinion dated May 2, 2017 for PCT International Patent Application No. PCT/EP2016/077315, 15 pages.
Database WPI, week 201259, Thomson Scientific, AN 2012-J54440, XP002766458, 3 pages.
PCT Written Opinion of the International Preliminary Examining Authority dated Oct. 24, 2017 for PCT International Patent Application No. PCT/EP2016/077315, 7 pages.
PCT Notification of Transmittal of the International Preliminary Report on Patentability dated Feb. 27, 2018 for PCT International Patent Application No. PCT/EP2016/077315, 23 pages.

* cited by examiner

UREA-BASED BLEND COMPOSITION AND METHOD FOR THE MANUFACTURE THEREOF

CROSS-REFERENCE TO RELATED APPLICATIONS

This application is a U.S. national stage entry under 35 U.S.C. § 371 of PCT International Patent Application No. PCT/EP2016/077315, filed Nov. 10, 2016, which claims priority to Norwegian Patent Application No. 20151546, filed Nov. 12, 2015, the contents of which are incorporated herein by reference in their entirety.

FIELD OF THE INVENTION

This invention relates to a solid, particulate, urea-based blend composition comprising a urea-based compound in particulate form, one or more components in particulate form, selected from the group of nitrates, phosphates, sulphates and chlorides, and a urease inhibitor of the type phosphoric triamide, in particular N-(n-butyl) thiophosphoric triamide (nBTPT), with improved properties for reducing ammonia loss by urease activity in the soil. The invention further relates to a method for the manufacture of a solid, particulate urea-based blend composition comprising a urea-based compound in particulate form, one or more components in particulate form, selected from the group of nitrates, phosphates, sulphates and chlorides, and a urease inhibitor of the type phosphoric triamide, in particular N-(n-butyl) thiophosphoric triamide (nBTPT). The product is in particular suitable as a fertilizer.

BACKGROUND OF THE INVENTION

Urea is the most common nitrogen-containing fertilizer. Urea has the highest nitrogen content of all nitrogen-containing fertilizers in common use (46%). Its consumption worldwide has been considerably increased, from about 20 million tons in the early seventies to about 100 million tons at the beginning of the twenty first century. Nitrogen is a basic element for any living system as a constituent of protein.

Urea is often used as such, but also as a component of a particulate blend, i.e. a physical blend or bulk blend, containing additional (primary and secondary nutrient) elements, such as potassium, phosphor, nitrogen and sulphur to obtain a particulate NPK(S), NP(S) or NK(S) blend, and other elements such as magnesium and calcium (secondary nutrients). In that respect, urea can easily be blended with, for example, potassium sulphate (sulphate of potash, SOP) and potassium magnesium sulphate (sulphate of potash magnesia). Urea can also be blended with sodium nitrate (Chilean nitrate 16-0-0), ammonium sulphate (sulphate of ammonia), urea ammonium sulphate (UAS), mono ammonium phosphate (MAP), di-ammonium phosphate (DAP), rock phosphate, potassium chloride (muriate of potash, MOP) and urea calcium nitrate (UCAN).

Particulate urea can hardly be mixed and stored as a blend with certain chemicals due to hygroscopic double salt formation or release of crystal water but can be mixed, and co-applied shortly after, with calcium nitrate, ammonium nitrate, calcium ammonium nitrate or limestone ammonium nitrate, ammonium sulphate nitrate, potassium ammonium nitrate (nitropotash), superphosphate, and triple superphosphate. A more detailed list can be found in "Guidance for the compatibility of fertilizer blending materials" by EFMA, Brussels, Belgium, June 2006.

Furthermore, urea particles can be "doped" or coated with elemental sulphur to supply sulphur, or indirectly sulphates, to the soil, preferably in sulphur-deficient soils.

Unfortunately, urea nitrogen cannot be assimilated directly by the plants and needs to be converted through hydrolysis into ammonium and nitrification into nitrate. Urea is first hydrolysed in the soil under the action of an enzyme, commonly called urease, to produce ammonia and carbon dioxide. Ureases are found in numerous bacteria, fungi, algae, plants and some invertebrates, as well as in soils, as a soil enzyme. Urea hydrolysis tends to increase the pH of its environment as the ammonia is dissolved into the water in the soil, and part of the ammonia can also be released into the atmosphere, a process called ammonia volatilization, thus becoming unavailable for the plant. About 50 weight % of nitrogen can sometimes be lost as a result of the volatilization of ammonia, all depending on the soil type, water content, pH, climate conditions, etc.

The availability of nitrogen, originating from urea, to the root system of plants can be improved by combining a urea-containing fertilizer (i.e. by incorporation or addition) with a urease inhibitor. Urease inhibitors are compounds that are capable of temporarily reducing the activity of the enzyme and slow down the rate at which urea is hydrolysed, avoiding peaks of ammonia concentration and therefore limiting the losses to the air. There are many compounds that can inhibit urease, but only a few that are non-toxic, effective at low concentrations, chemically stable enough and able to be combined with urea-containing fertilizers.

Among the most effective urease inhibitors known today are the phosphoric triamide compounds, first disclosed in U.S. Pat. No. 4,530,714 (Allied Corporation, 1985).

An example of an effective urease inhibitor, disclosed in said patent is N-(n-butyl) thiophosphoric triamide, which will be referred to herein as nBTPT. This compound is actually the precursor for the active compound N-(n-butyl) phosphoric triamide (nBPT), obtained through oxidation of the thio-compound, but it is the thio-compound that is commonly produced, sold and used. Throughout this application, when referring to urease inhibitors of the type phosphoric triamide, it is understood that this comprises all active compounds, active precursors and active conversion products, resulting from said phosphoric triamides.

When combined with a urea-containing fertilizer, phosphoric triamide compounds reduce the rate at which urea is hydrolysed to ammonia in the soil. The benefits that are realized as a result of the delayed urea hydrolysis include the following: (1) nutrient nitrogen is available to the plant over a longer period of time, (2) excessive build-up of ammonia in the soil following the application of the urea-containing fertilizer is avoided, (3) the potential for nitrogen loss through ammonia volatilization is reduced, (4) the potential for damage by high levels of ammonia to seedlings and young plants is reduced, (5) plant uptake of nitrogen is increased, and (6) an increase in crop yields is attained. While phosphoric triamide compounds do not directly influence the rate of ammonium nitrification, they do control the levels of ammonium which are subject to the nitrification process and thereby indirectly controls the levels of nitrate nitrogen in the soil.

Surprisingly, the inventors have now been confronted with the problem that the urease inhibitor of the type phosphoric triamide, especially when applied as a liquid, which is the most common commercially available form, is not stable when in contact with a urea-based blend composition comprising a urea-based compound in particulate form and one or more components in particulate form, selected from the group of nitrates, phosphates, sulphates and chlorides, despite the fact that a urease inhibitor of the type phosphoric triamide is generally disclosed for use with urea-based fertilizers. Moreover, even a urease inhibitor of the type phosphoric triamide in an alkaline organic solvent, such as a mixture of propylene glycol and N-methylpyrrolidine, stabilised to allow for long storage time of the solution, is rapidly degraded once applied on a urea-based blend composition. Furthermore, the urease inhibitor of the type phosphoric triamide, also applied as a solid, is not stable when in contact with a urea-based blend composition comprising a urea-based compound in particulate form and one or more components in particulate form, selected from the group of nitrates, phosphates, sulphates and chlorides. The problem is most relevant for the storage of said urea-based blend composition, where the urea-based compound in particulate form, one or more components in particulate form, selected from the group of nitrates, phosphates, sulphates and chlorides and the urease inhibitor of the type phosphoric triamide are in intimate contact with one another for a prolonged period of time.

This finding was most surprising, but stimulated the inventors to find a solution for the problem of stabilizing the urease inhibitor (i.e. reducing its degradation) in the presence of a particulate blend of a urea-based compound in particulate form and one or more components in particulate form, selected from the group of nitrates, phosphates, sulphates and chlorides.

In this context, stability refers to the property of a chemical compound, in particular the urease inhibitor compound of resisting chemically degradation. An improved stability means a longer lifetime (or shelf life).

According to one embodiment, the blend composition may be in a packaged form, such as a bag. According to another embodiment, the blend composition may be a transient composition, as it exists when mixed in a mixing device, for example before it is packaged or applied onto the field.

PRIOR ART

CN 102503687 (Stanley Chemical Fertilizer Stock Co., 2012) discloses a melt-granulated fertilizer, where all ingredients are mixed, melted and granulated, comprising urea, MAP, ammonium chloride, potassium chloride, a urease inhibitor, a nitrification inhibitor, a polypeptide synergist and 50 to 140 parts of talcum powder as a filler material. The document does not disclose a physical blend composition according to the current invention and is silent about the problem of the current invention.

WO2011/009572 (SKW Stickstoffwerke Piesteritz GmbH, 2011) teaches in general a urea-based granular fertilizer composition, in particular a particulate blend of urea and ammonium sulphate (Example 7), a urease inhibitor of the type phosphoric triamide in powder form and a paraffin-based wax. The composition does not comprise a reactive alkaline or alkaline-forming inorganic or organic compound, nor is disclosed the problem of the current invention.

US2012/0096912 (Rizzo, 2012) discloses a method for improving the yield of rice plants by applying a granular UAS that includes nBTPT. The composition does not comprise a reactive alkaline or alkaline-forming inorganic or organic compound, nor is disclosed the problem of the current invention.

US 2010/0206031 A1 (Whitehurst, G. B. et al, 2010) describes a composition (Example 7) consisting of nBTPT in a basic organic amine alcohol solvent, coated onto a blend of urea-particles and mono ammonium phosphate particles. The composition does not comprise a reactive alkaline or alkaline-forming inorganic or organic compound, nor is disclosed the problem of the current invention.

US2014/037570 A1 (Whitehurst, G. B. et al, 2014) describes compositions consisting of nBTPT in a basic organic amine solvent, coated onto urea-particles, comprising one or more additional plant nutrients as water soluble salts such as ammonium sulphate, mono ammonium phosphate, potassium sulphate and others. The compositions do not comprise a urea-based blend composition, nor a reactive alkaline or alkaline-forming inorganic or organic compound, nor is disclosed the problem of the current invention.

STATEMENT AND SUMMARY OF THE INVENTION

Surprisingly, the inventors now found that the stability of the urease inhibitor of the type phosphoric triamide in the presence of a urea-based blend composition comprising a urea-based compound in particulate form and one or more components in particulate form, selected from the group of nitrates, phosphates, sulphates and chlorides, can be greatly improved.

In its broadest concept, the invention is concerned with a solid, particulate, urea-based blend composition comprising a urea-based compound in particulate form and one or more components in particulate form, selected from the group of nitrates, phosphates, sulphates and chlorides, and a urease inhibitor of the type phosphoric triamide, wherein the urea-based blend composition is further characterized in that it comprises one or more reactive alkaline or alkaline-forming inorganic or organic compounds.

With regard to the activity of the reactive alkaline or alkaline-forming inorganic or organic compounds, without being bound by theory, it is hypothesised that the reactive alkaline or alkaline-forming inorganic or organic compound neutralises the released phosphoric acid which is formed during decomposition of the urease inhibitor of the type phosphoric triamide in view of the fact that the decomposition of the urease inhibitor of the type phosphoric triamide is acid-catalysed. As such, the decomposition of the urease inhibitor of the type phosphoric triamide is slowed down. Furthermore, the stabilizer has the ability to immobilize the nitrates, phosphates, sulphates and chlorides and/or to convert the nitrates, phosphates, sulphates and chlorides into a form which is less reactive with the urease inhibitor of the type phosphoric triamide. For example, calcium oxide may react with ammonium sulphate in the presence of water, which is always present in small amounts in urea, to form calcium sulphate, which is nearly insoluble in an aqueous environment, such as a soil. Experiments with talc (an inert magnesium silicate mineral) on urea ammonium sulfate comprising nBTPT, which showed no stabilizing effect, seem to support this hypothesis.

Hence, when the term "reactive" is used, it is meant to comprise an interaction with said one or more components selected from the group of nitrates, phosphates, sulphates and chlorides and/or with decomposition products of the urease inhibitor of the type phosphoric triamide, in particular phosphoric acid.

By the integration of the stabilizer into the urea-based blend composition comprising the urea-based compound, the one or more components in particulate form, selected from the group of nitrates, phosphates, sulphates and chlorides and a urease inhibitor of the type phosphoric triamide, the stability of the urease inhibitor of the type phosphoric triamide is greatly improved, especially during storage, such that lower amounts of said urease inhibitor may be used.

Accordingly, the present invention provides a solid, particulate, urea-based blend composition comprising a urea-based compound in particulate form, one or more components in particulate form, selected from the group of nitrates, phosphates, sulphates and chlorides, and a urease inhibitor of the type phosphoric triamide, wherein the urea-based blend composition is further characterized in that it comprises 5 weight % or less, relative to the total weight of the composition, of one or more reactive alkaline or alkaline-forming inorganic or organic compounds.

In a preferred embodiment of the present invention, the urea-based blend composition is further characterized in that the average particle size (dp50) of the urea-based compound in particulate form and the one or more components in particulate form, selected from the group of nitrates, phosphates, sulphates and chlorides is between 1.0 mm and 5 cm, as determined by mesh sieve screening.

In a preferred embodiment of the present invention, the urea-based blend composition is characterized in that it further comprises an anti-caking and/or moisture repellent and/or anti-dust coating.

In a preferred embodiment of the present invention the urea-based blend composition is characterized in that the urease inhibitor of the type phosphoric triamide is a compound of formula:

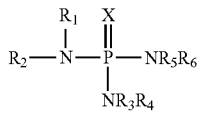

wherein:
X is oxygen or sulphur;
$R_1$ is alkyl, cycloalkenyl, aralkyl, aryl, alkenyl, alkynyl, or cycloalkyl;
$R_2$ is hydrogen, alkyl, cycloalkenyl, aralkyl, aryl, alkenyl, alkynyl, or cycloalkyl; or $R_1$ and $R_2$ together may form an alkylene or alkenylene chain which may optionally include one or more heteroatoms of divalent oxygen, nitrogen or sulphur completing a 4, 5, 6, 7, or 8 membered ring system; and
$R_3$, $R_4$, $R_5$ and $R_6$ are individually hydrogen or alkyl having 1 to 6 carbon atoms.

In a preferred embodiment of the present invention the urease inhibitor in said urea-based blend composition is N-(n-butyl) thiophosphoric triamide (nBTPT).

In a preferred embodiment of the present invention, the urease inhibitor, in particular N-(n-butyl) thiophosphoric triamide (nBTPT) is present in the urea-based blend composition at a level of 0.0001 to 1 weight %, preferable 0.02 to 0.2% weight %, most preferably 0.04 to 0.06 weight %, relative to the total weight of the urea-based blend composition.

In a preferred embodiment of the present invention, wherein the urease inhibitor of said urea-based blend composition is applied onto the urea-based compound in liquid or in particulate form, is melt-mixed with the urea-based compound, or a combination thereof.

In a preferred embodiment of the present invention the one or more reactive alkaline or alkaline-forming inorganic or organic compounds in said urea-based blend composition is able to interact with said one or more components selected from the group of nitrates, phosphates, sulphates and chlorides.

In a preferred embodiment of the present invention the reactive alkaline-forming or alkaline inorganic or organic compound in said urea-based blend composition is selected from the group of metal oxides, carbonates, hydroxides, acetates, and organic bases, and any mixture thereof.

In a preferred embodiment of the present invention the reactive alkaline-forming or alkaline compound in said urea-based blend composition is selected from the group of calcium oxide, zinc oxide, magnesium oxide, calcium carbonate, and any mixture thereof.

In a preferred embodiment of the present invention the reactive alkaline-forming or alkaline compound is present in the urea-based blend composition at a level of 0.0001 to 5 weight %, preferable 0.02 to 1 weight %, most preferably 0.05 to 1 weight %, relative to the total weight of the composition.

In a preferred embodiment of the present invention the weight ratio of urease inhibitor of the type phosphoric triamide to one or more reactive alkaline or alkaline-forming inorganic compounds within the urea-based blend composition ranges from 1:20 to 1:1, preferably from 1:15 to 1:1, more preferably from 1:10 to 1:1.

In a preferred embodiment of the present invention, the urea-based blend composition further comprises an anti-caking and/or moisture repellent and/or anti-dust coating, applied onto the particulate components of the urea-based blend composition, wherein the coating comprises at least a non-polar material, in particular a liquid organic material, such as an oil, wax, resin or the like and any mixture thereof and is present in the composition at a level of 0.0001 to 1 weight %, preferable 0.02 to 0.5 weight %, most preferably 0.1 to 0.2 weight %, relative to the total weight of the composition.

In a preferred embodiment of the present invention the urea-based blend composition is packaged without the presence of a head space.

In a preferred embodiment of the present invention the urea-based compound within said urea-based blend composition is selected from the group of urea, urea calcium sulphate (UCaS), urea calcium nitrate (UCaN), urea magnesium nitrate (UMgN), urea calcium phosphate (UCaP), urea magnesium phosphate (UMgP), urea superphosphate (USP), urea calcium ammonium nitrate (UCAN), urea ammonium sulphate (UAS), urea ammonium phosphate (UAP), urea potassium salts (UK), or mixtures thereof.

In a preferred embodiment of the present invention, wherein the one or more components in particulate form, are selected from the group of nitrates, phosphates, sulphates and chlorides is selected from the group of: ammonium nitrate, calcium nitrate, calcium ammonium nitrate, sodium nitrate, ammonium sulphate nitrate, potassium ammonium nitrate, ammonium phosphate, such as mono-ammonium phosphate (MAP) and di-ammonium phosphate (DAP), calcium bis(dihydrogen orthophosphate), super phosphate, triple superphosphate, rock phosphate, potassium sulphate, potassium magnesium sulphate, ammonium sulphate (AS), urea ammonium sulphate, urea calcium ammonium nitrate, urea ammonium sulphate, potassium chloride (MOP), urea potassium salts (UK), or mixtures thereof.

In a preferred embodiment of the present invention the urea-based blend composition comprises from about 0.1 to 60 weight % of one or more components in particulate form, selected from the group of nitrates, phosphates, sulphates and chlorides.

In a preferred embodiment of the present invention the urea-based blend composition contains:
- 40 to 99 weight % of a urea-based compound in particulate form;
- 0.1 to 60 weight % of one or more components in particulate form, selected from the group of nitrates, phosphates, sulphates and chlorides;
- 0.0001 to 1 weight % of a urease inhibitor of the type phosphoric triamide;
- 0.0001 to 5 weight % of one or more reactive alkaline or alkaline-forming inorganic or organic compounds;
- 0 to 1 weight % of an anti-caking and/or moisture repellent and/or anti-dust coating;

adding up to 100 weight %, being the total weight of the composition.

In a preferred embodiment of the present invention the urea-based blend composition comprises urea in particulate form either coated or melt-mixed with a urease inhibitor of the type phosphoric triamide, in particular N-(n-butyl) thiophosphoric triamide (nBTPT), ammonium phosphate (MAP or DAP) in particulate form, potassium chloride (MOP), and calcium oxide.

In a preferred embodiment of the present invention the urea-based blend composition comprises urea in particulate form either coated or melt-mixed with a urease inhibitor of the type phosphoric triamide, in particular N-(n-butyl) thiophosphoric triamide (nBTPT), ammonium sulphate (AS) in particulate form, and calcium oxide.

The present invention further provides for the use of the solid, particulate urea-based blend composition according to different embodiments of the present invention as a fertilizer, in particular for supporting the growth of agricultural products on a sulphur-deficient soil, a phosphor-deficient soil and/or a potassium-deficient soil.

The present invention further provides for the use of the solid, particulate urea-based blend composition according to different embodiments of the present invention as an animal feed.

The present invention further provides for a method for the manufacture of a solid, particulate, urea-based blend composition according to the present invention, the method comprising the steps of:
1) providing a urea-based particulate material which is treated with a urease inhibitor in solid particulate or liquid form, preferably wherein the urease inhibitor is N-(n-butyl) thiophosphoric triamide (nBTPT)
2) providing a particulate material, comprising one or more components selected from the group of nitrates, phosphates, sulphates and chlorides;
3) providing one or more reactive alkaline or alkaline-forming inorganic or organic compounds that is able to interact with the one or more components selected from the group of nitrates, phosphates, sulphates and chlorides;
4) mixing the components provided in steps 1), 2), and 3);
5) optionally, applying a coating to one or more of the particulate compounds, wherein the coating that is able to increase at least the anti-caking and/or water repellence and/or anti-dust properties of said urea-based blend composition.

The present invention further provides for a kit of parts, comprising:
a) one or more reactive alkaline or alkaline-forming inorganic or organic compounds, preferably that is able to interact with the one or more components selected from the group of nitrates, phosphates, sulphates and chlorides;
b) the urease inhibitor of the type phosphoric triamide in solid particulate or liquid form, preferably wherein the urease inhibitor is N-(n-butyl) thiophosphoric triamide (nBTPT);
c) optionally, one or more anti-caking and/or moisture repellent and/or anti-dust compounds.

The present invention further provides for a method for improving the stability of a urease inhibitor of the type phosphoric triamide, in particular N-(n-butyl) thiophosphoric triamide, (nBTPT) in a solid, particulate, urea-based blend composition comprising a urea-based compound in particulate form, one or more components in particulate form, selected from the group of nitrates, phosphates, sulphates and chlorides and said urease inhibitor, comprising the steps of:
a) addition to the composition of 5 weight % or less, relative to the total weight of the composition, of one or more reactive alkaline or alkaline-forming inorganic or organic compounds; and optionally
b) application of an anticaking and/or moisture repellent coating onto said urea-based blend composition.

The invention will now be described in more detail.

DETAILED DESCRIPTION OF THE INVENTION

Within the context of this application, with a particulate form is meant a physical form that can also be designated as granulated, prilled, crystalline, compacted, powdered, and the like, wherein the respective compound is in a small unit form.

Herein after, the one or more reactive alkaline or alkaline-forming inorganic or organic compounds is called a stabilizer.

Urease Inhibitor

In its broadest concept, the invention is concerned with a solid, particulate, urea-based blend composition comprising a urea-based compound in particulate form, one or more components in particulate form, selected from the group of nitrates, phosphates, sulphates and chlorides, and a urease inhibitor of the type phosphoric triamide, in particular N-(n-butyl) thiophosphoric triamide (nBTPT), wherein the urease inhibitor of the type phosphoric triamide is a compound of formula I:

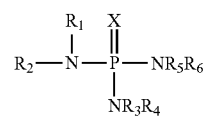

Formula I wherein:
X is oxygen or sulphur;
$R_1$ is alkyl, cycloalkenyl, aralkyl, aryl, alkenyl, alkynyl, or cycloalkyl;
$R_2$ is hydrogen, alkyl, cycloalkenyl, aralkyl, aryl, alkenyl, alkynyl, or cycloalkyl, or $R_1$ and $R_2$ together may form an alkylene or alkenylene chain which may optionally include one or more heteroatoms of divalent oxygen, nitrogen or sulphur completing a 4, 5, 6, 7, or 8 membered ring system; and
$R_3$, $R_4$, $R_5$ and $R_6$ are individually hydrogen or alkyl having 1 to 6 carbon atoms. In the present specification and claims, the term "phosphoric triamide compounds" is used to refer to the compounds of formula I.

The terms alkyl, cycloalkenyl, aralkyl, aryl, alkenyl, alkynyl, and cycloalkyl as used herein, refer to compounds having from up to 10 carbon atoms, preferably up to 6 carbon atoms. The lowest number of carbon atoms is between 1-3 depending on the structure of the substituent.

nBTPT is sold in the market, in different formulations and has the following chemical formula

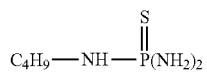

It should be understood that the term nBTPT, as used throughout this specification, refers not only to N-(n-butyl) thiophosphoric triamide in its pure form, but also to industrial grades of this compound which may contain up to 50 weight % impurities, depending on the method of synthesis and purification scheme(s), if any, employed in the production of the nBTPT.

In order to be effective, the urease inhibitor of the type phosphoric triamide, in particular N-(n-butyl) thiophosphoric triamide (nBTPT) is present in the urea-based blend composition at a level of 0.0001-1 weight %, preferable 0.02-0.2% weight %, most preferably 0.04-0.06 weight %, relative to the total weight of the urea-based blend composition.

In embodiments where the urease inhibitor is used in its liquid form, it is preferably used as a 0.1 to 75 weight % solution, preferably as a 15 to 30 weight % solution. Commercial solutions are available, for example as Agrotain® Ultra (Koch, US), N Yield™ (Eco Agro, US), Rhodia Ag-Rho™ N Protect B (Solvay, Germany), Iper N-Protect Liquid (Van Iperen, The Netherlands) and BASF Limus (BASF, Germany).

Experiments showed that, in compositions according to the invention, less urease inhibitor of the type phosphoric triamide, in particular N-(n-butyl) thiophosphoric triamide (nBTPT) needs to be used than is commonly employed in the prior art. For example, an amount of 0.05 weight % is mostly preferred as already agronomically efficient, while for the use of Agrotain® Ultra, an amount of 0.09 weight % is recommended. This finding can at least partly be attributed to the fact that in the compositions according to the invention, the urease inhibitor of the type phosphoric triamide, in particular N-(n-butyl) thiophosphoric triamide (nBTPT) is stabilized, while in the prior art, an overdose is needed to compensate for the degradation of the urease inhibitor and to increase shelf-live thereof. This finding also ensures that less urease inhibitor of the type phosphoric triamide, in particular N-(n-butyl) thiophosphoric triamide (nBTPT) is introduced into the environment. In embodiments where the urease inhibitor is used in its solid form, it is used as a powder, preferably with a purity of 99 weight % or more. It is available, for example, from Sunfit Chemical Co. (China).

According to one embodiment, the urease inhibitor of the type phosphoric triamide, in particular N-(n-butyl) thiophosphoric triamide (nBTPT) is applied to the urea-based compound in particulate form as a coating using common coating and blending techniques, well known to the skilled person, such as spray-coating and drum-coating. The urease inhibitor of the type phosphoric triamide, in particular N-(n-butyl) thiophosphoric triamide (nBTPT) may be applied onto the urea-based compound in liquid or in particulate form.

When in particulate form, the particle size (dp50) of the urease inhibitor of the type phosphoric triamide, in particular N-(n-butyl) thiophosphoric triamide (nBTPT), is preferably between 1 and 1000 μm, preferable between 10 and 500 μm, as determined by mesh sieve screening.

According to another embodiment, the urease inhibitor of the type phosphoric triamide, in particular N-(n-butyl) thiophosphoric triamide (nBTPT) is melt-mixed with the urea-based compounds, in the sense that the urease inhibitor of the type phosphoric triamide, in particular N-(n-butyl) thiophosphoric triamide (nBTPT) is mixed in a urea melt, either as solid or as liquid, after which the melt is processed into solid particles.

According to yet another embodiment, a combination of application onto the urea-based compound in liquid or in particulate form and melt-mixing can be used.

Within the context of this invention, melt-mixed refers to a state where the urease inhibitor of the type phosphoric triamide, in particular N-(n-butyl) thiophosphoric triamide (nBTPT) is mainly present inside the solid particle, typically adding during the forming process of the solid particle.

It is preferred that the urease inhibitor of the type phosphoric triamide, in particular N-(n-butyl) thiophosphoric triamide (nBTPT), is in intimate contact with the urea-based compound for the urease inhibitor to be most effective in terms of urease inhibition. However, embodiments may be foreseen wherein the urease inhibitor is applied as a coating to one or more other particulate components of the blend, such as the stabilizer or the one or more components in particulate form, selected from the group of nitrates, phosphates, sulphates and chlorides.

Stabilizer

According to the present invention, the solid, particulate, urea-based blend composition comprising a urea-based compound in particulate form, one or more components in particulate form, selected from the group of nitrates, phosphates, sulphates and chlorides, and a urease inhibitor of the type phosphoric triamide, comprises one or more reactive alkaline or alkaline-forming inorganic or organic compounds.

Within the context of this application, the wording "able to interact" or "reactive" means that the stabilizer is able to interact and/or react in any way (ionic, covalent, chelating, etc.) with the one or more components in particulate form, selected from the group of nitrates, phosphates, sulphates and chlorides, and/or with decomposition products of the urease inhibitor of the type phosphoric triamide, in particular phosphoric acid, in order to immobilize said nitrates, phosphates, sulphates, chlorides and decomposition products and/or convert them into a form which is less reactive with the urease inhibitor of the type phosphoric triamide. This excludes, for example, compositions comprising organic alkaline solvents as inert carriers for the urease inhibitor of the type phosphoric triamide. Compositions comprising such organic alkaline solvents acting as carriers for a urease inhibitor of the type phosphoric triamide are known from e.g. US patent applications 2010/0206031 and 2014/0037570, and are also commercially available.

According to one embodiment, said stabilizer is selected from the group of: metal oxides, such as calcium oxide, magnesium oxide, zinc oxide, sodium oxide, aluminium oxide, barium oxide and copper oxide; carbonates, such as calcium carbonate, sodium carbonate, ammonium carbonate, barium carbonate; hydroxides, such as aluminium hydroxide, ammonium hydroxide, sodium hydroxide, potassium hydroxide, calcium hydroxide, magnesium hydroxide, iron hydroxide, barium hydroxide and tetraalkyl/aryl ammonium hydroxides; and acetates, such as sodium acetate, ammonium acetate, magnesium acetate, zinc acetate and barium acetate; and any mixture thereof.

According to one embodiment of the present invention, said stabilizer is selected from the group of: organic bases, such as amines, such as triethylamine, ethanolamine and triethanolamine; amides, such as sodium amide and magnesium diamide; adenines; amidines; guanidines; anilines; carbamates; thiazoles; triazoles; pyridines; imidazoles; benzimidazoles; histidines; phosphazenes; and any mixture thereof.

The stabilizer may be a solid, preferably a particulate material, a liquid, or a suspension (solid in liquid).

Preferably, the stabilizer is applied as a coating to the particles of the urea-based blend composition, in particular to said urea-based compound in particulate form and/or to said one or more components in particulate form, selected from the group of nitrates, phosphates, sulphates and chlorides.

When in particulate form, the particle size (dp50) of the stabilizer is between 1 and 1000 μm, preferable between 10 and 500 μm, as determined by mesh sieve screening. For example, for CaO, a dp50 of about 22 μm was found very effective.

By including the stabilizer into the urea-based blend composition comprising a urea-based compound in particulate form, one or more components in particulate form, selected from the group of nitrates, phosphates, sulphates and chlorides and a urease inhibitor of the type phosphoric triamide, the stability of the urease inhibitor of the type phosphoric triamide is greatly improved, leading, among others, to the possibility of a more prolonged storage while keeping the urease inhibition property, before subsequent use of said urea-based blend composition.

Preferably, the stabilizer is selected from the group of calcium oxide, zinc oxide, magnesium oxide, calcium carbonate, and any mixture thereof. Advantageously, these metals (Ca, Zn and Mg) may also function as a nutrient element to plants in the soil.

In order to be effective, the stabilizer is present in the composition at a level of 0.0001 to 5 weight %, preferable 0.02 to 1 weight %, most preferably 0.05 to 1 weight %, relative to the total weight of the composition.

According to one embodiment, the weight ratio of urease inhibitor of the type phosphoric triamide (either liquid or solid) to the one or more alkaline or alkaline-forming inorganic compounds ranges from 1:20 to 1:1, preferably from 1:15 to 1:1, more preferably from 1:10 to 1:1. Exemplary, a weight ratio of nBTPT to CaO of about 1:5.5 was used.

The stabilizer is applied to the composition comprising the urea-based compound and one or more components in particulate form, selected from the group of nitrates, phosphates, sulphates and chlorides as a coating by common application techniques, such as coating and blending techniques, well known to the skilled person, such as spray-coating and drum-coating. It is preferred that the stabilizer and the urease inhibitor of the type phosphoric triamide is in intimate contact with each other, in order for the stabilizer to be effective. This can be achieved, most preferably, through the application of the urease inhibitor of the type phosphoric triamide, the stabilizer and an optional anti-caking and/or moisture repellent and/or anti-dust coating, to the particles, either successively, or simultaneously, for example as a liquid anti-caking and/or moisture repellent and/or anti-dust coating composition comprising the urease inhibitor of the type phosphoric triamide and the stabilizer.

Urea-Based Compound

The urea-based compound may be selected from the group of urea, urea calcium sulphate (UCaS), urea calcium nitrate (UCaN), urea magnesium nitrate (UMgN), urea calcium phosphate (UCaP), urea magnesium phosphate (UMgP), urea superphosphate (USP), urea calcium ammonium nitrate (UCAN), urea ammonium sulphate (UAS), urea ammonium phosphate (UAP), urea potassium salts (UK) such as salts derived from mixtures of urea with MPO and/or SOP, or mixtures thereof, and is preferably urea.

The urea-based compound may be a granulated or prilled material that is commonly and widespread available. It may contain elemental sulphur, be coated with micronutrients or other nutrients, or be treated in any other way.

The solid, particulate, urea-based blend composition may comprise from about 40 to 99 weight % of a urea-based compound in particulate form.

Preferably, to serve as a fertilizer, the average particle size (dp50) of the urea-based compound in particulate form is between 1.0 mm and 5 cm, preferably between 1.0 mm and 1 cm, preferably between 1.0 and 6.0 mm, preferably between 2.0 and 4.0 mm, preferably between 3.0 and 5.0 mm, preferably between 2.5 and 3.6 mm, as determined by mesh sieve screening.

The definition of the urea-based compound, as disclosed herein, does not comprise its use as a coating material. Such coating material has a smaller particle size (dp50), usually between 0.1 and 100 μm.

Nitrate, Phosphate, Sulphate and/or Chloride Component

The one or more components in particulate form, selected from the group of nitrates, phosphates, sulphates and chlorides may be at least one of the following compounds: ammonium nitrate, calcium nitrate, calcium ammonium nitrate, sodium nitrate, ammonium sulphate nitrate, potassium ammonium nitrate, ammonium phosphate, such as mono-ammonium phosphate (MAP) and di-ammonium phosphate (DAP), calcium bis(dihydrogen orthophosphate), super phosphate, triple superphosphate, rock phosphate, potassium sulphate, potassium magnesium sulphate, ammonium sulphate (AS), urea ammonium sulphate, urea calcium ammonium nitrate, urea ammonium sulphate, potassium chloride (MOP), urea potassium salts (UK), or mixtures thereof.

The component may be a granulated or prilled material that is commonly and widespread available. It may contain elemental sulphur, be coated with micronutrients or other nutrients, or be treated in any other way.

The urea-based blend composition may comprise from about 0.1 to 60 weight %, relative to the total weight of the composition, of one or more components in particulate form, selected from the group of nitrates, phosphates, sulphates and chlorides.

Preferably, to serve as a fertilizer, the average particle size (dp50) of the one or more components in particulate form, selected from the group of nitrates, phosphates, sulphates and chlorides is between 1.0 mm and 5 cm, preferably between 1.0 mm and 1 cm, preferably between 1.0 and 6.0 mm, preferably between 2.0 and 4.0 mm, preferably between 3.0 and 5.0 mm most preferably between 2.5 and 3.6 mm, as determined by mesh sieve screening.

The definition of the one or more components, as disclosed herein, does not comprise its use as a coating material. Such coating material has a smaller particle size (dp50), usually between 0.1 and 100 μm.

Anti-Caking and/or Moisture Repellent and/or Anti-Dust Coating

Optionally, an anti-caking and/or moisture repellent and/or anti-dust coating may be applied onto the particulate components of the urea-based blend composition, wherein the coating material is able to increase the moisture repellence of the urea-based compound in particulate form and/or the one or more components in particulate form, selected from the group of nitrates, phosphates, sulphates and chlorides. Furthermore, the coating may also be able to reduce dust formation. Preferably, the coating material is a non-polar material, in particular a liquid organic material, such as an oil, wax, resin or the like and any mixture thereof. The coating material is present in the composition at a level 0 to 1 weight %, preferably 0.0001 to 1 weight %, more preferable 0.02 to 0.5 weight %, most preferably 0.1 to 0.2 weight %, relative to the total weight of the composition.

Examples of suitable anticaking and/or moisture-repellent coatings are vegetable oil (e.g. rapeseed or neem), paraffin and Novoflow anti-caking and/or moisture repellence agents (Novochem Fertilizer Additives, The Netherlands).

Preferably, the moisture-repellent coating is a coating such as disclosed in EP 0768993 A1 (Norsk Hydro ASA), the content of which is enclosed hereby by reference, for a nitrogen-containing fertilizer, comprising at least a wax, an oil and a resin which is oil-soluble and miscible with wax (Tropicote®).

Further Effects

It was also observed that, under bagged conditions without the presence of a head space, i.e. with the substantial exclusion of moisture, atmospheric gasses such as oxygen, nitrogen, etc., the stability of the urease inhibitor of the type phosphoric triamide, in particular N-(n-butyl) thiophosphoric triamide (nBTPT) in the composition according to the invention, was further increased. Hence, the invention is in particular directed to a packaged, preferably bagged, urea-based blend composition comprising a urea-based compound in particulate form, one or more components in particulate form, selected from the group of nitrates, phosphates, sulphates and chlorides and a solid particulate urease inhibitor of the type phosphoric triamide, in particular N-(n-butyl) thiophosphoric triamide (nBTPT). As used in this application, "bagged" means that the product is packaged such that it is in essence not in contact with moisture and atmospheric gasses during the period it is packaged. Hence, the package may be a bag, big bag, container, box, etc., being in principle all packaging without the substantial presence of a head space, filled with an atmosphere, such as air. As used in this application, "bagged" further means that the product is packaged in manageable unit amounts, such as 5 kg, 10 kg, 15 kg, 20 kg, 25 kg, 50 kg, or more, and usually packaged using a plastic material, preferably a foil, from such materials as paper, cardboard, polyethylene, polyvinyl and polycarbonate.

Accordingly, a particular aspect refers to a container or package comprising the urea-based blend composition as disclosed herein, wherein the head space in said container or package is less than about 1%.

In the context of the present invention, the term "headspace" refers to the volume left at the top of the almost filled container before or after sealing.

In the context of the present invention, the term "about", when associated with the headspace, means +/−0.1%. For example, "about 1%" means that 1.1%, 1.05%, 0.95% or 0.9% are also encompassed.

In a preferred embodiment, the container as described herein comprises a headspace of less than 1%, preferably less than 0.75%, preferably less than 0.5%, preferably less than 0.25% and preferably no headspace, based on the total volume of said container.

Blends

Preferably, the solid, particulate urea-based blend composition according to the invention is a homogeneous blend composition, wherein all particles of the blend are randomly in intimate contact with each other.

According to one aspect of the invention, the solid, particulate, urea-based blend composition according to the present invention comprises:

40 to 99 weight % of a urea-based compound in particulate form;

0.1 to 60 weight % of one or more components in particulate form, selected from the group of nitrates, phosphates, sulphates and chlorides;

0.0001 to 1 weight % of a urease inhibitor of the type phosphoric triamide;

0.0001 to 5 weight % of one or more reactive alkaline or alkaline-forming inorganic or organic compounds;

0 to 1 weight % of an anti-caking and/or moisture repellent and/or anti-dust coating;

adding up to 100 weight %, being the total weight of the composition.

In particular, the invention relates to a solid, particulate, urea-based blend composition comprising urea in particulate form either coated or melt-mixed with a urease inhibitor of the type phosphoric triamide, in particular N-(n-butyl) thiophosphoric triamide (nBTPT), ammonium phosphate (MAP or DAP) in particulate form, potassium chloride (MOP), and calcium oxide (as the stabilizer).

In particular, the invention relates to a solid, particulate, urea-based blend composition comprising urea in particulate form either coated or melt-mixed with a urease inhibitor of the type phosphoric triamide, in particular N-(n-butyl) thiophosphoric triamide (nBTPT), ammonium sulphate (AS) in particulate form, and calcium oxide (as the stabilizer).

In particular, the invention relates to a solid, particulate, urea-based blend composition comprising urea in particulate form either coated or melt-mixed with a urease inhibitor of the type phosphoric triamide, in particular N-(n-butyl) thiophosphoric triamide (nBTPT), ammonium phosphate (MAP or DAP) in particulate form, and calcium oxide (as the stabilizer).

In particular, the invention relates to a solid, particulate, urea-based blend composition comprising urea in particulate form either coated or melt-mixed with a urease inhibitor of the type phosphoric triamide, in particular N-(n-butyl) thiophosphoric triamide (nBTPT), potassium chloride (KCl) in particulate form, and calcium oxide (as the stabilizer).

Use of the Blend Composition

The solid, particulate urea-based blend composition according to the invention is in particular suitable as a fertilizer, in particular for supporting the growth of agricultural products on a sulphur-deficient soil, for supporting the growth of agricultural products on a phosphor-deficient soil, for supporting the growth of agricultural products on a potassium-deficient soil and as an animal feed.

Method

The invention further relates to a method for the manufacture of a solid, particulate urea-based blend composition comprising a urea-based compound in particulate form, one or more components in particulate form, selected from the group of nitrates, phosphates, sulphates and chlorides, and a urease inhibitor of the type phosphoric triamide, in particular N-(n-butyl) thiophosphoric triamide (nBTPT).

In particular, the invention relates to a method for the manufacture of a solid, particulate, urea-based blend composition according to the invention, the method comprising the steps of:

1) providing a urea-based particulate material which is treated (e.g; coated or melt-mixed) with a urease inhibitor in solid particulate or liquid form, preferably wherein the urease inhibitor is N-(n-butyl) thiophosphoric triamide (nBTPT)

2) providing a particulate material, comprising one or more components selected from the group of nitrates, phosphates, sulphates and chlorides;

3) providing one or more reactive alkaline or alkaline-forming inorganic or organic compounds;

4) mixing the components provided in steps 1), 2), and 3);

5) optionally, applying a coating to one or more of the particulate components that is able to increase at least the anti-caking and/or water repellence and/or anti-dust properties of said urea-based blend composition, Steps 1) 2), 3) and 5) can be interchanged or steps 1) 2), 3), and 5) can be performed simultaneously, for example as the addition of a liquid anti-caking and/or moisture repellent coating composition comprising the urease inhibitor of the type phosphoric triamide and the reactive alkaline or alkaline-forming compound.

Kit-of-Parts

The invention further relates to a kit of parts, comprising:
a) one or more reactive alkaline or alkaline-forming inorganic or organic compounds;
b) the urease inhibitor of the type phosphoric triamide in solid particulate or liquid form, preferably wherein the urease inhibitor is N-(n-butyl) thiophosphoric triamide (nBTPT);
c) optionally, one or more anti-caking and/or moisture repellent and/or anti-dust compounds.

Such kit of parts can then be added to the urea-based blend composition, in particular to the particulate urea-based compound to the one or more components in particulate form, selected from the group of nitrates, phosphates, sulphates and chlorides, to obtain the solid, particulate, urea-based blend composition comprising a urea-based compound in particulate form, one or more components in particulate form, selected from the group of nitrates, phosphates, sulphates and chlorides, the stabilizer and a urease inhibitor of the type phosphoric triamide according to the invention.

The preferred embodiments of the method according to the invention will now be illustrated by means of the following non-limitative examples.

EXAMPLES

Figure 1:
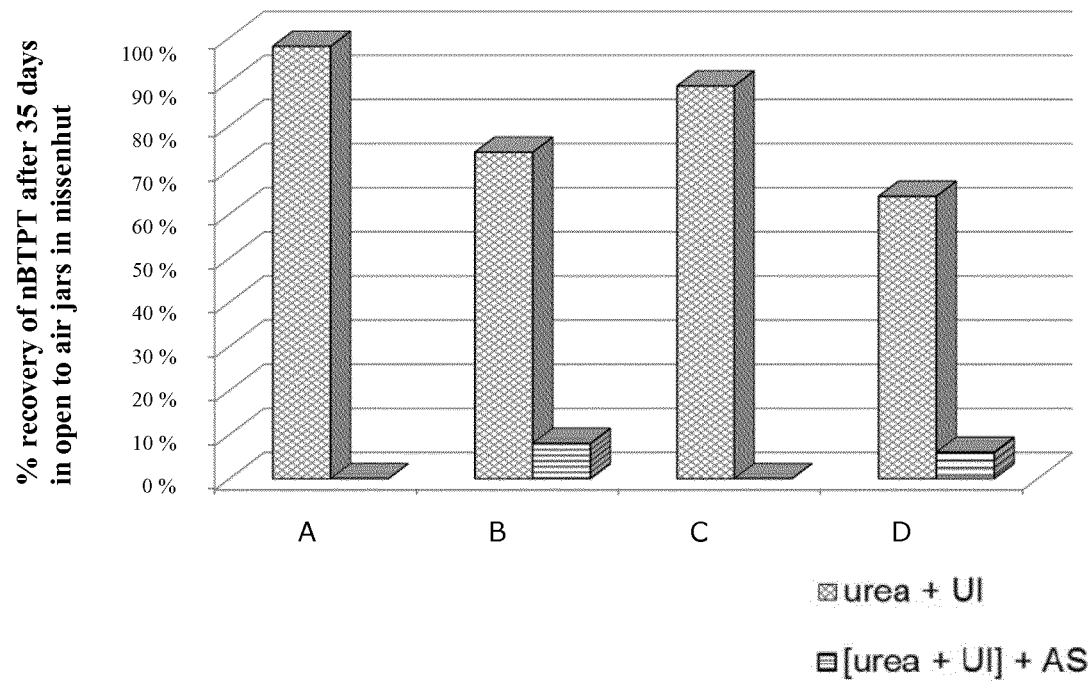
FIG. 1: Stability of different liquid nBTPT-formulations applied in and on granular urea with or without blending with granular AS (1:1 ratio urea:AS)-% recovery of nBTPT after 35 days of storage open to air in jars in nissenhut (day/night cycle 16-42° C./27-77% relative humidity). [A=Agrotain® Ultra in urea, B=Agrotain® Ultra on urea, C=N Yield™ in urea, C=N Yield™ on urea].

A=[900 ppm nBTPT as Agrotain® Ultra on urea]+DAP 1:1 ratio.

B=[900 ppm nBTPT as Agrotain® Ultra on urea+3000 ppm NH coating]+DAP 1:1 ratio

EXPERIMENTAL 1. nBTPT Experiments nBTPT was mixed in urea in the following way: nBTPT was added to urea melt and subsequently this mixture was granulated in a fluidized bed granulator.

For lab scale experiments, nBTPT was applied onto urea by adding 1.2 kg of urea-based compound to a lab scale drum. In a next step, the nBTPT material was slowly added. A residence time of 10 minutes was applied and the rotating speed of the drum was consequently the same in each experiment. In case a moisture repellent coating was added, a nebulizer was used and depending on the order of addition, the moisture repellent coating was added before or after addition of the nBTPT material. Before use, the moisture repellent coating was preheated to 80° C. Larger scale experiments with amounts up to 40 kg of fertilizer material were performed in a concrete mixer.

In a next step, one or more reactive alkaline or alkaline-forming inorganic or organic compounds that is able to interact with the one or more components selected from the group of nitrates, phosphates, sulphates and chlorides was added;

In a next step, a particulate material, comprising one or more components selected from the group of nitrates, phosphates, sulphates and chlorides was added;

All the components were mixed thoroughly.

Optionally, a coating to one or more of the particulate components that is able to increase at least the anti-caking and/or water repellent properties of said urea-based blend composition was added. Importantly, all the steps can be interchanged or the steps can be performed simultaneously.

The samples were stored under several conditions, dependent on the type of samples:
  20° C. closed plastic container with head space (Climate chamber, 80% relative humidity)
  Bagged at room temperature (20-25° C.) or in nissenhut (an unconditioned bulk hall)
  Open to air in nissenhut
  Cylinder test in nissenhut
  Open pile in nissenhut
For some samples, an accelerated stability test was done storing these samples at elevated temperatures:
  Oven of 30° C. closed plastic container
  Oven of 30° C. open to air
  30° C./60% RH open to air
  70° C. closed plastic container
Typically, a day/night cycle is generated in the nissenhut, with temperature fluctuations between 0 to 42° C. and fluctuations of relative humidity between 20 and 90%, which can be compared with real life storage in silos.

2. HPLC Analysis of nBTPT-Content

HPLC analysis of nBTPT is done as described in the procedure CEN 15688-2007.

In practice, the urea-based compound treated with nBTPT was picked and separated manually from the particulate material, comprising one or more components selected from the group of nitrates, phosphates, sulphates and chlorides, and then subsequently dissolved in water for HPLC analysis.

3. Products

Solid N-(n-butyl)thiophosphoric triamide was obtained from Sunfit Chemical Co. (China) (CAS-Nr. 94317-64-3), as a white crystalline solid with a melting point of 58-60° C.

DAP (NP 18-46-0, 90% 2-4 mm) was obtained from Triferto

KCl was obtained from K+S Kali GmbH.

AS was obtained from OCI (granular 2 mm and 3 mm grade)

Coating: Moisture repellent (MR) coating was made according to EP 0768993 A1 (Norsk Hydro ASA) by mixing about 28 weight % of wax, about 68 weight % of oil and about 4 weight % of a resin, applied in an amount of about 0.1-0.5% weight % to the fertilizer. It will be referred herein as NH coating.

Example 1: Definition of the Problem

Figure 3:
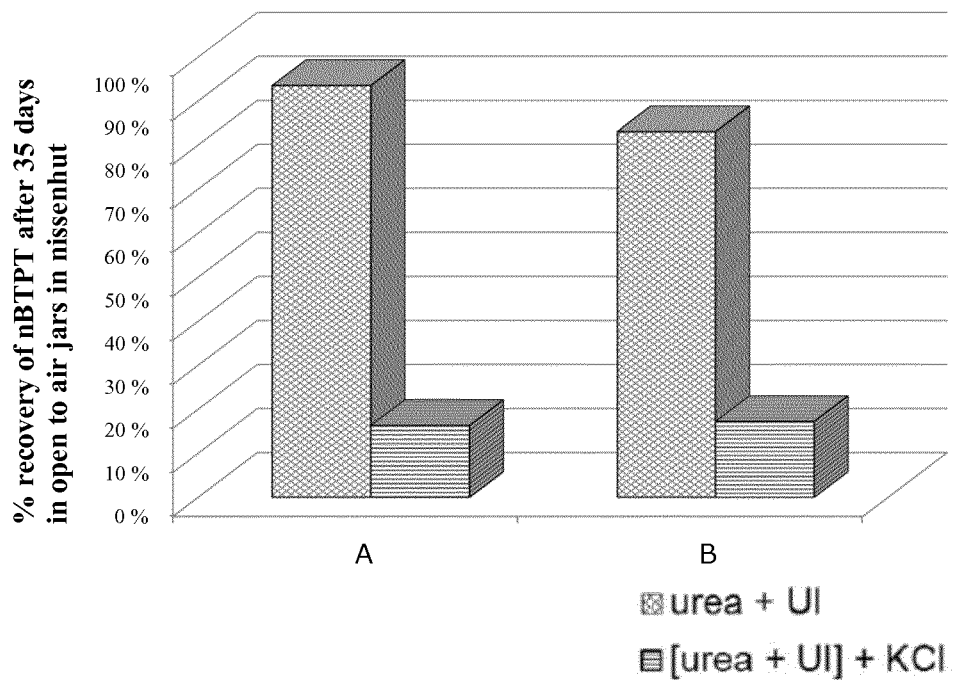
FIG. 3: Stability of solid nBTPT applied in and on urea (500 ppm nBTPT addition) with or without blending with KCl (1:1 ratio urea:KCl)-% recovery of nBTPT after 35 days of storage open to air in jars in nissenhut (day/night cycle 16-42° C./27-77% relative humidity). [A=nBTPT powder in urea, B=nBTPT powder on urea].

FIG. 1 shows the stability of different commercially available liquid nBTPT-formulations, applied in and on urea with (left bar) or without (right bar) blending with granular ammonium sulphate (AS) (500 ppm nBTPT addition). The % recovery of nBTPT after 35 days of storage open to air in jars in nissenhut (day/night cycle 16-42° C./27-77% relative humidity) is shown. FIG. 3 shows clearly that, in contrast to urea, treated with nBTPT and not blended with AS, nBTPT degrades very fast when the urea, treated with nBTPT, is blended with granular AS.

Figure 2:
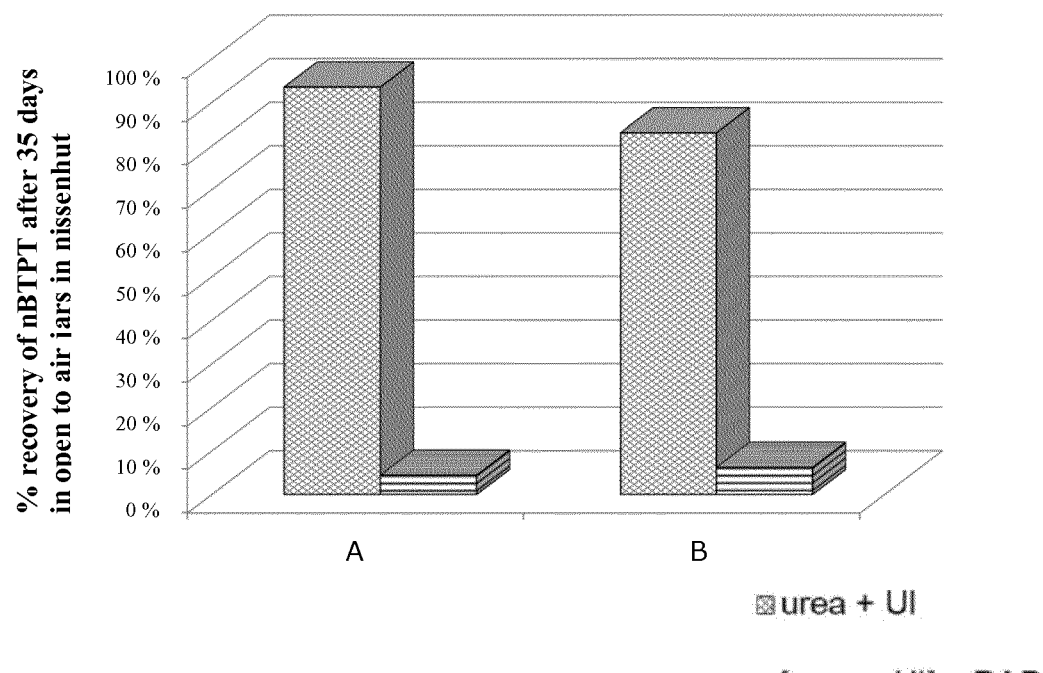
FIG. 2: Stability of solid nBTPT applied in and on urea (500 ppm nBTPT addition) with or without blending with DAP (1:1 ratio urea:DAP)-% recovery of nBTPT after 35 days of storage open to air in jars in nissenhut (day/night cycle 16-42° C./27-77 relative humidity). [A=nBTPT powder in urea, B=nBTPT powder on urea].

FIG. 2 shows the stability of solid nBTPT (500 ppm nBTPT addition) applied in and on urea with (left bar) or without (right bar) blending with di-ammonium phosphate (DAP). The % recovery of nBTPT after 35 days of storage open to air in jars in nissenhut (day/night cycle 16-42° C./27-77 relative humidity) is shown. FIG. 1 shows clearly that, in contrast to urea, treated with nBTPT and not blended with DAP, nBTPT in said compositions degrades very fast when the urea, treated with nBTPT, is blended with DAP in a 1:1 ratio. The degradation of nBTPT that is present in urea, is somewhat lower than when applied onto urea, but in the presence of DAP, the stability is drastically reduced in both cases.

FIG. 3 shows the stability of solid nBTPT (500 ppm nBTPT addition) applied in and on urea with (left bar) or without (right bar) blending with KCl. The % recovery of nBTPT after 35 days of storage open to air in jars in nissenhut (day/night cycle 16-42° C./27-77% relative humidity) is shown. FIG. 1 shows clearly that, in contrast to urea, treated with nBTPT and not blended with KCl, nBTPT in said compositions degrades very fast when the urea, treated with nBTPT, is blended with DAP in a 1:1 ratio. The degradation of nBTPT that is present in urea, is somewhat lower than when applied onto urea, but in the presence of DAP, the stability is drastically reduced in both cases.

Figure 4:
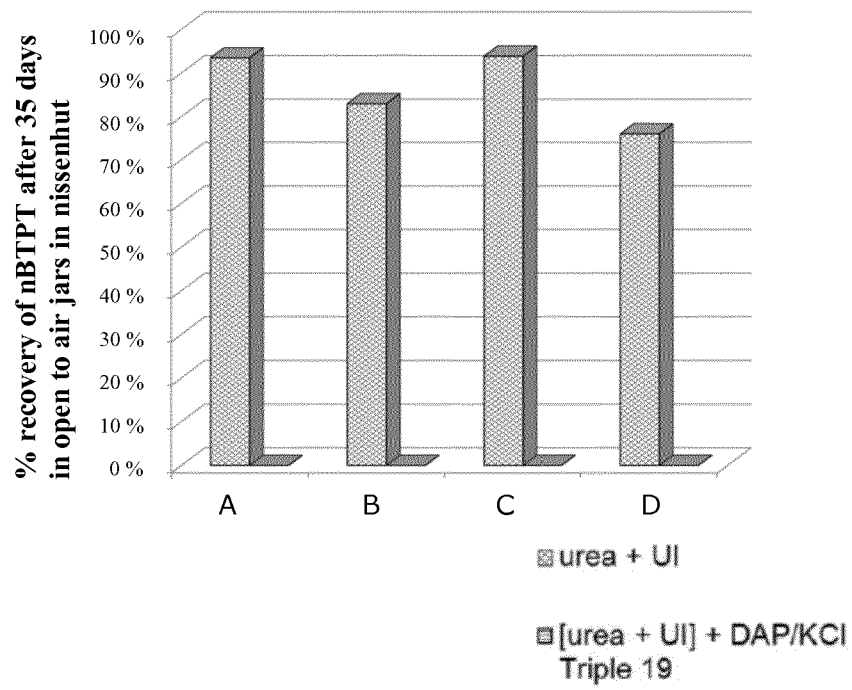
FIG. 4: Stability of different nBTPT-formulations (500 ppm nBTPT addition) applied in and on urea with or without blending with DAP and KCl (Triple 19 ratio)-% recovery of nBTPT after 35 days of storage open to air in jars in nissenhut (day/night cycle 16-42° C./27-77% relative humidity). [A=nBTPT powder in urea, B=nBTPT powder on urea, C=Agrotain® Ultra (liquid) in urea, D=Agrotain® Ultra (liquid) on urea].

FIG. 4 shows the stability of different nBTPT-formulations (500 ppm nBTPT addition) applied in and on urea with (left bar) or without (right bar) blending with DAP and KCl (Triple 19 ratio). The % recovery of nBTPT after 35 days of storage open to air in jars in nissenhut (day/night cycle 16-42° C./27-77% relative humidity) is shown. FIG. 3 shows clearly that, in contrast to urea treated with nBTPT and not blended with DAP and KCl, nBTPT degrades very dramatically when urea, treated with nBTPT, is blended with DAP and KCl in a triple 19 ratio.

Example 2: Effect of CaO on Urea/AS-Blend

This example shows the beneficial effect of the addition of a reactive alkaline or alkaline-forming inorganic or organic compound on the stability of nBTPT in and on urea when blended with AS.

Figure 5:
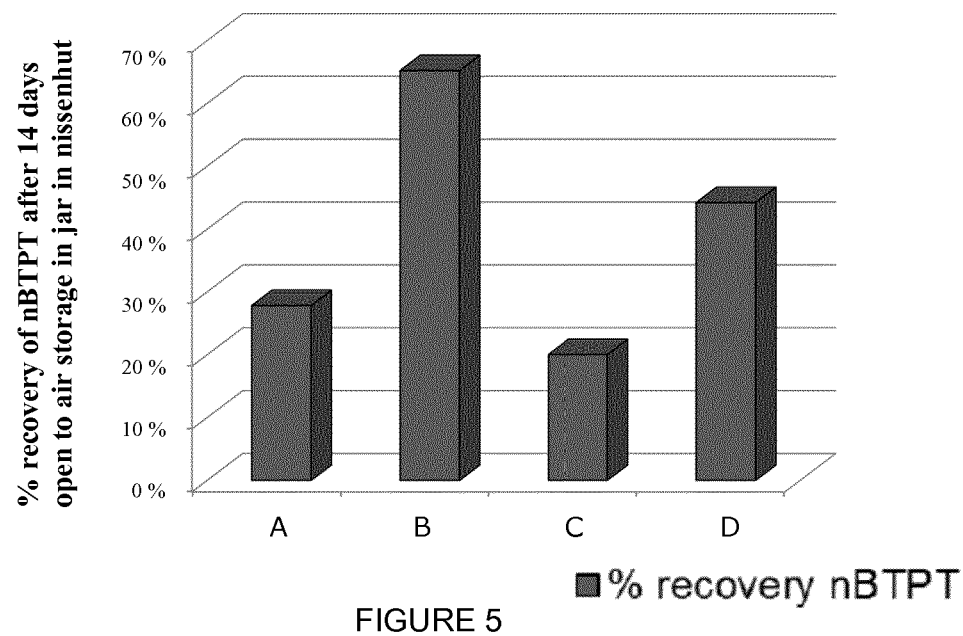
FIG. 5. Stability of nBTPT in and on urea with or without blending with granular AS: effect of the addition of CaO-% recovery of nBTPT after 14 days of open to air storage in jars at nissenhut (day/night cycle 16-42° C./27-77% relative humidity).
A=[500 ppm nBTPT powder in urea]+AS 1:1
B=[500 ppm nBTPT powder in urea+2650 ppm CaO]+AS 1:1
C=[500 ppm nBTPT powder on urea]+AS 1:1
D=[500 ppm nBTPT powder on urea+2650 ppm CaO]+AS 1:1

FIG. 5 shows the stability of nBTPT in and on urea with or without blending with granular AS and the effect of the addition of CaO. The recovery of nBTPT after 14 days of open to air storage in jars at nissenhut (day/night cycle 16-42° C./27-77% relative humidity) is shown. The figure clearly shows the beneficial effect of the addition of CaO on the stability of nBTPT in or on urea blended with granular AS.

Example 3: Effect of Alkaline or Alkaline-Forming Inorganic or Organic Compound on Urea/DAP/KCl-Blend (NPK)

This example shows the beneficial effect of the addition of a reactive alkaline or alkaline-forming inorganic or organic compound on the stability of nBTPT in and on urea when blended with DAP and KCl in triple 19 ratio (NPK 19:19:19) or blended with DAP in a 1:1 (weight/weight) ratio.

Figure 6:
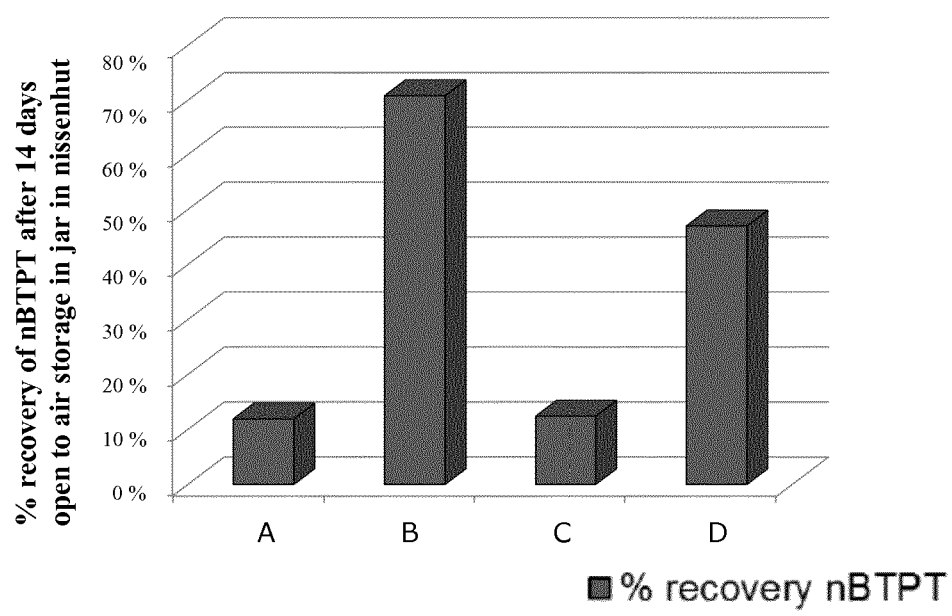
FIG. 6: Stability of nBTPT in and on urea with or without blending with DAP and KCl (Triple 19 ratio): effect of the addition of CaO-% recovery of nBTPT after 14 days of open to air storage in jars at nissenhut (day/night cycle 16-42° C./27-77% relative humidity).
A=[500 ppm nBTPT powder in urea]+DAP/KCl triple 19
B=[500 ppm nBTPT powder in urea+2650 ppm CaO]+DAP/KCl triple 19
C=[500 ppm nBTPT powder on urea]+DAP/KCl triple 19
D=[500 ppm nBTPT powder on urea+2650 ppm CaO]+DAP/KCl triple 19

FIG. 6 shows the stability of nBTPT in and on urea with or without blending with DAP and KCl and the effect of the addition of CaO. The recovery of nBTPT after 14 days of open to air storage in jars at nissenhut (day/night cycle 16-42° C./27-77% relative humidity) is shown. The figure clearly shows the beneficial effect of the addition of CaO on the stability of nBTPT in or on urea blended with DAP and KCl.

Figure 7:
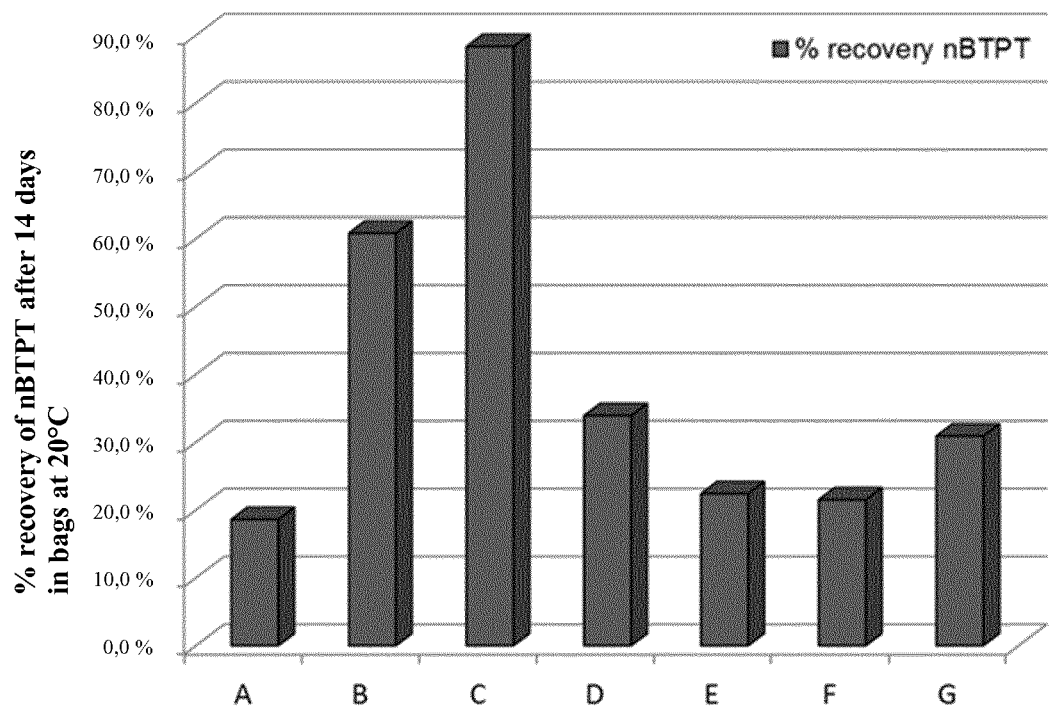
FIG. 7: Stability of nBTPT on urea blended with DAP in 1:1 (weight/weight) ratio: effect of the addition of CaO, MgO, ZnO, CaCO₃, triethylamine and diethanolamine-% recovery of nBTPT after 14 days of bagged storage at 20° C.
A=[900 ppm nBTPT as Agrotain® Ultra on urea]+DAP 1:1 ratio
B=[900 ppm nBTPT as Agrotain® Ultra on urea+2500 ppm CaO]+DAP 1:1 ratio
C=[900 ppm nBTPT as Agrotain® Ultra on urea+2500 ppm MgO]+DAP 1:1 ratio
D=[900 ppm nBTPT as Agrotain® Ultra on urea+2500 ppm ZnO]+DAP 1:1 ratio
E=[900 ppm nBTPT as Agrotain® Ultra on urea+2500 ppm CaCO₃]+DAP 1:1 ratio
F=[900 ppm nBTPT as Agrotain® Ultra on urea+2500 ppm triethylamine]+DAP 1:1 ratio
G=[900 ppm nBTPT as Agrotain® Ultra on urea+2500 ppm diethanolamine]+DAP 1:1 ratio FIG. 8. Stability of different nBTPT formulations (500 ppm) in and on urea in a blend with granular AS: bagged versus open to air storage-% recovery of nBTPT after 35 days of storage in nissenhut (day/night cycle 16-42° C./27-77% relative humidity).
A=[500 ppm nBTPT powder in urea]+AS 1:1
B=[500 ppm nBTPT powder on urea]+AS 1:1
C=[500 ppm nBTPT as Agrotain® Ultra in urea]+AS 1:1
D=[500 ppm nBTPT as Agrotain® Ultra on urea]+AS 1:1

FIG. 7 shows the stability of nBTPT on urea with or without blending with DAP in a 1:1 (weight/weight) ratio and the effect of the addition of alkaline inorganic compounds CaO, MgO, ZnO and $CaCO_3$ and alkaline organic compounds triethylamine and diethanolamine. The recovery of nBTPT (in %) after 14 days of bagged storage at 20° C. is shown. The figure clearly shows the beneficial effect of the addition of these alkaline inorganic and organic compounds on the stability of nBTPT on urea blended with DAP in a 1:1 (weight/weight) ratio.

Example 4: Storage in Bags Versus Open to Air Storage

This example shows the beneficial effect of the storage in bags without head space versus storage open to air on the stability of nBTPT in and on urea:AS 1:1 (weight:weight) blends.

Figure 8:
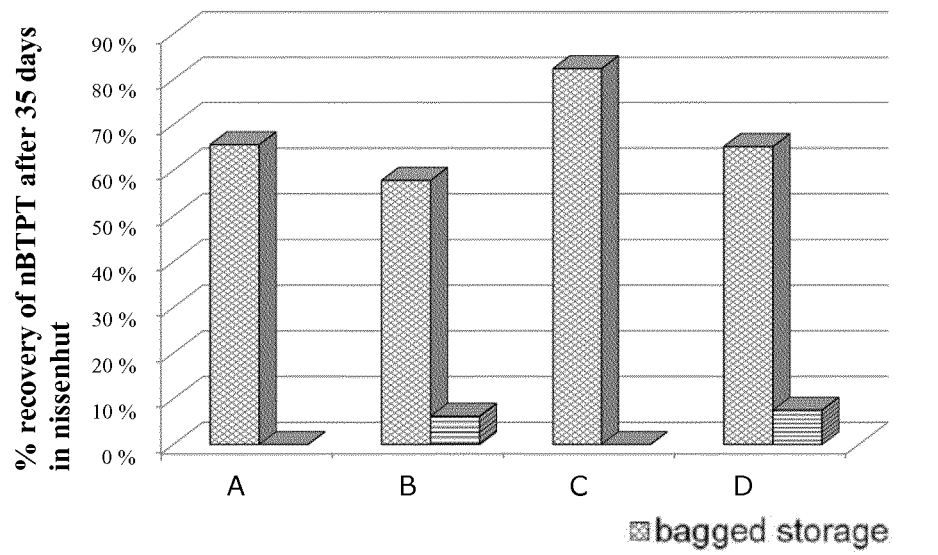

FIG. 8 shows the stability of different nBTPT formulations (500 ppm) in and on urea in a blend with granular AS when stored under bagged conditions versus open to air storage in jars. The graphs shows clearly the beneficial effect of bagged storage of the urea:AS blend on the stability of nBTPT in/on urea in contrast when storage was done open to air.

Example 5: Effect of the Addition of a Coating on Urea/DAP-Blend

This example shows the beneficial effect of the addition of a moisture repellent coating on urea on the stability of nBTPT on urea:DAP 1:1 (weight:weight) blends.

Figure 9:
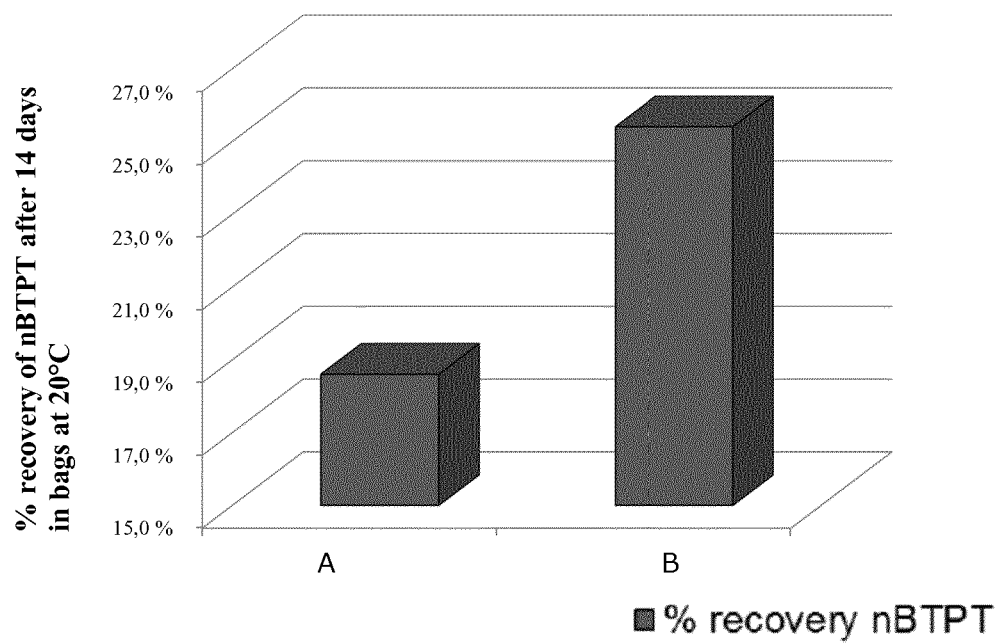
FIG. 9: Stability of nBTPT on urea blended with DAP in 1:1 (weight/weight) ratio: effect of the addition of moisture repellent coating-% recovery of nBTPT after 14 days of bagged storage at 20° C.

FIG. 9 shows the stability of nBTPT on urea in a blend with DAP in a 1:1 (weight/weight) ratio and the effect of the addition of a moisture repellent coating on [urea+nBTPT]. The recovery of nBTPT after 14 days of storage in bags at 20° C. is presented. The graph shows a small stabilizing effect of the addition of NH coating on the stability of nBTPT.

No NH coating: 18.6% recovery of nBTPT
With NH coating: 25.4% recovery of nBTPT

The invention claimed is:

1. A solid, particulate, urea-based physical blend composition comprising a urea-based compound in particulate form, one or more components in particulate form, selected from the group of nitrates, phosphates, sulphates and chlorides, and a urease inhibitor of the type phosphoric triamide, wherein the urea-based physical blend composition is further characterized in that it comprises 0.0001 to 1 weight %, relative to the total weight of the composition, of one or more reactive alkaline or alkaline-forming inorganic or organic compounds, wherein the one or more reactive alkaline or alkaline-forming inorganic or organic compounds is able to interact with said one or more components selected from the group of nitrates, phosphates, sulphates and chlorides, with the proviso that the alkaline-forming compound is not an organic alkaline solvent, used as inert carrier for the urease inhibitor of the type phosphoric triamide.

2. The urea-based physical blend composition according to claim 1, characterized in that the average particle size (dp50) of the urea-based compound in particulate form and the one or more components in particulate form, selected from the group of nitrates, phosphates, sulphates and chlorides is between 1.0 mm and 5 cm, as determined by mesh sieve screening.

3. The urea-based physical blend composition according to claim 1, characterized in that it further comprises an anti-caking coating, a moisture repellent coating, an anti-dust coating, or combinations thereof.

4. The urea-based physical blend composition according to claim 1, characterized in that the urease inhibitor of the type phosphoric triamide is a compound of formula:

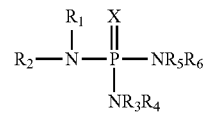

wherein:
X is oxygen or sulphur;
$R_1$ is alkyl, cycloalkenyl, aralkyl, aryl, alkenyl, alkynyl, or cycloalkyl;
$R_2$ is hydrogen, alkyl, cycloalkenyl, aralkyl, aryl, alkenyl, alkynyl, or cycloalkyl; or $R_1$ and $R_2$ together may form an alkylene or alkenylene chain which may optionally include one or more heteroatoms of divalent oxygen, nitrogen or sulphur completing a 4, 5, 6, 7, or 8 membered ring system; and
$R_3$, $R_4$, $R_5$ and $R_6$ are individually hydrogen or alkyl having 1 to 6 carbon atoms.

5. The urea-based physical blend composition according to claim 1, wherein the urease inhibitor is N-(n-butyl) thiophosphoric triamide (nBTPT).

6. The urea-based physical blend composition according to claim 1, wherein the urease inhibitor is present at a level of 0.0001 to 1% weight %, relative to the total weight of the urea-based physical blend composition.

7. The urea-based physical blend composition according to claim 1, wherein the urease inhibitor is applied onto the urea-based compound in liquid or in particulate form, is melt-mixed with the urea-based compound, or a combination thereof.

8. The urea-based physical blend composition according to claim 1, wherein the reactive alkaline-forming or alkaline inorganic or organic compound is selected from the group of metal oxides, carbonates, hydroxides, acetates, and organic bases, and any mixture thereof.

9. The urea-based physical blend composition according to claim 8, wherein the reactive alkaline-forming or alkaline compound is selected from the group of calcium oxide, zinc oxide, magnesium oxide, calcium carbonate, and any mixture thereof.

10. The urea-based physical blend composition according to claim 1, wherein the reactive alkaline-forming or alkaline compound is present in the composition at a level of 0.02 to 1 weight %, relative to the total weight of the composition.

11. The urea-based physical blend composition according to claim 1, wherein the weight ratio of urease inhibitor of the type phosphoric triamide to one or more reactive alkaline or alkaline-forming inorganic compounds ranges from 1:20 to 1:1.

12. The urea-based physical blend composition according to claim 1, further comprising an anti-caking coating, a moisture repellent coating, an anti-dust coating, or combinations thereof, applied onto the particulate components of the urea-based physical blend composition, wherein the coating comprises at least a non-polar material present in the composition at a level of 0.0001 to 1 weight %, relative to the total weight of the composition.

13. The urea-based physical blend composition according to claim 1, wherein the urea-based physical blend composition is packaged without the presence of a head space.

14. The urea-based physical blend composition according to claim 1, wherein the urea-based compound is selected from the group of urea, urea calcium sulphate (UCaS), urea calcium nitrate (UCaN), urea magnesium nitrate (UMgN), urea calcium phosphate (UCaP), urea magnesium phosphate (UMgP), urea superphosphate (USP), urea calcium ammonium nitrate (UCAN), urea ammonium sulphate (UAS), urea ammonium phosphate (UAP), urea potassium salts (UK), or mixtures thereof.

15. The urea-based physical blend composition according to claim 1, wherein the one or more components in particulate form, selected from the group of nitrates, phosphates, sulphates and chlorides is selected from the group of: ammonium nitrate, calcium nitrate, calcium ammonium nitrate, sodium nitrate, ammonium sulphate nitrate, potassium ammonium nitrate, ammonium phosphate, calcium bis(dihydrogen orthophosphate), super phosphate, triple superphosphate, rock phosphate, potassium sulphate, potassium magnesium sulphate, ammonium sulphate (AS), urea ammonium sulphate, urea calcium ammonium nitrate, urea ammonium sulphate, potassium chloride (MOP), urea potassium salts (UK), or mixtures thereof.

16. The urea-based physical blend composition according to claim 1, wherein the composition contains from about 0.1 to 60 weight % of one or more components in particulate form, selected from the group of nitrates, phosphates, sulphates and chlorides.

17. The urea-based physical blend composition according to claim 1, wherein the composition contains:
40 to 99 weight % of a urea-based compound in particulate form;
0.1 to 60 weight % of one or more components in particulate form, selected from the group of nitrates, phosphates, sulphates and chlorides;
0.0001 to 1 weight % of a urease inhibitor of the type phosphoric triamide;
0.0001 to 1 weight % of one or more reactive alkaline or alkaline-forming inorganic or organic compounds; and
0 to 1 weight % of an anti-caking coating, a moisture repellent coating, an anti-dust coating, or combinations thereof, adding up to 100 weight %, being the total weight of the composition.

18. The urea-based physical blend composition according to claim 1, comprising urea in particulate form either coated or melt-mixed with a urease inhibitor of the type phosphoric triamide, ammonium phosphate (MAP or DAP) in particulate form, potassium chloride (MOP), and magnesium oxide.

19. The urea-based physical blend composition according to claim 1, comprising urea in particulate form either coated or melt-mixed with a urease inhibitor of the type phosphoric triamide, ammonium sulphate (AS) in particulate form, and magnesium oxide.

20. The urea-based physical blend composition according to claim 1, wherein the urease inhibitor is present at a level of 0.002 to 0.2 weight %, relative to the total weight of the urea-based physical blend composition.

21. The urea-based physical blend composition according to claim 1, wherein the urease inhibitor is present at a level of 0.04 to 0.06 weight %, relative to the total weight of the urea-based physical blend composition.

22. The urea-based physical blend composition according to claim 1, wherein the reactive alkaline-forming or alkaline compound is present in the composition at a level of 0.05 to 1 weight %, relative to the total weight of the composition.

23. The urea-based physical blend composition according to claim 1, wherein the weight ratio of urease inhibitor of the type phosphoric triamide to one or more reactive alkaline or alkaline-forming inorganic compounds ranges from 1:15 to 1:1.

24. The urea-based physical blend composition according to claim 1, wherein the weight ratio of urease inhibitor of the type phosphoric triamide to one or more reactive alkaline or alkaline-forming inorganic compounds ranges from 1:10 to 1:1.

25. A fertilizer, in particular for supporting the growth of agricultural products on a sulphur-deficient soil, a phosphor-deficient soil, a potassium-deficient soil, or combinations thereof, comprising the urea-based physical blend composition according to claim 1.

26. An animal feed comprising the urea-based physical blend composition according to claim 1.

27. A method for the manufacture of a solid, particulate, urea-based physical blend composition according to claim 1, the method comprising the steps of:
1) providing a urea-based particulate material which is treated with a urease inhibitor of the type phosphoric triamide in solid particulate or liquid form;
2) providing a particulate material, comprising one or more components selected from the group of nitrates, phosphates, sulphates and chlorides;
3) providing 0.0001 to 1 weight %, relative to the total weight of the composition, of one or more reactive alkaline or alkaline-forming inorganic or organic compounds that is able to interact with the one or more components selected from the group of nitrates, phosphates, sulphates and chlorides, with the proviso that the alkaline-forming compound is not an organic alkaline solvent, used as inert carrier for the urease inhibitor of the type phosphoric triamide; and
4) mixing the components provided in steps 1), 2), and 3); and
5) optionally, applying a coating to one or more of the particulate compounds, wherein the coating that is able to increase at least the anticaking property, water repellence property, anti-dust property, or a combination thereof, of said urea-based physical blend composition.

28. Method for improving the stability of a urease inhibitor of the type phosphoric triamide in a solid, particulate, urea-based physical blend composition comprising a urea-based compound in particulate form, one or more components in particulate form, selected from the group of nitrates, phosphates, sulphates and chlorides and said urease inhibitor, comprising the steps of:
   a) addition to the composition of 0.0001 to 1 weight %, relative to the total weight of the composition, of one or more reactive alkaline or alkaline-forming inorganic or organic compounds, that is able to interact with the one or more components selected from the group of nitrates, phosphates, sulphates and chlorides, with the proviso that the alkaline-forming compound is not an organic alkaline solvent, used as inert carrier for the urease inhibitor of the type phosphoric triamide; and
   b) optionally, application of an anticaking and/or moisture repellent coating onto said urea-based physical blend composition.

\* \* \* \* \*